US012664173B1

(12) United States Patent
Singh et al.

(10) Patent No.: US 12,664,173 B1
(45) Date of Patent: Jun. 23, 2026

(54) MANAGEMENT OF DATA EVENTS IN A DATALAKE ENVIRONMENT USING DATA CONTRACTS

(71) Applicant: Amazon Technologies, Inc., Seattle, WA (US)

(72) Inventors: Nikhilesh Singh, Brooklyn, NY (US); Avneendra Arun, Ashburn, VA (US); Radhika Venkataraman, Ashburn, VA (US); Neeraj Padarthi, Reston, VA (US); Ashu Razdan, Kirkland, WA (US); Matthew Thomas Bade, Seattle, WA (US); Mahesh Mishra, Plainfield, IL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/709,913

(22) Filed: Mar. 31, 2022

(51) Int. Cl.
*G06F 16/25* (2019.01)

(52) U.S. Cl.
CPC ................................. *G06F 16/254* (2019.01)

(58) Field of Classification Search
CPC .................................................... G06F 16/254
See application file for complete search history.

(56) References Cited

U.S. PATENT DOCUMENTS

| | | | | |
|---|---|---|---|---|
| 9,760,928 | B1 * | 9/2017 | Ward, Jr. ........... | G06Q 30/0619 |
| 10,356,150 | B1 * | 7/2019 | Meyers ................... | H04L 65/70 |
| 11,709,808 | B1 * | 7/2023 | Dageville ............. | G06F 16/221 707/803 |
| 2013/0073525 | A1 * | 3/2013 | Damon ................... | G06F 16/13 707/E17.005 |
| 2014/0279838 | A1 * | 9/2014 | Tsirogiannis ......... | G06F 16/235 707/603 |
| 2018/0129684 | A1 * | 5/2018 | Wilson .................. | G06F 16/254 |
| 2019/0370263 | A1 * | 12/2019 | Nucci ................... | G06F 16/254 |
| 2020/0250172 | A1 * | 8/2020 | Busjaeger ......... | G06F 16/24552 |
| 2020/0351373 | A1 * | 11/2020 | Gupta ................... | G06F 16/164 |
| 2023/0091775 | A1 * | 3/2023 | Manzano ............. | G06F 16/212 707/756 |
| 2023/0205757 | A1 * | 6/2023 | Gupta ................. | G06F 16/2246 707/703 |

* cited by examiner

*Primary Examiner* — Courtney Harmon
(74) *Attorney, Agent, or Firm* — Eversheds Sutherland (US) LLP

(57) ABSTRACT

Systems, devices, and methods are provided for processing data events in a datalake environment using data contracts. Techniques described herein may be utilized to decouple data acquisition from data ingestion to reduce dependencies within a data lake environment, reduce or need for coordination by data producers with downstream data consumers, and allow for self-manage their schemas through versioning.

20 Claims, 10 Drawing Sheets

Data Contract 204

Metadata
208

Partition Key
206

Contract
Versions
210

Consumers
212

Data Contract 214

· · ·

· · ·

Contract
Table
202

700

800

Obtain Request To Create Table, The Request Comprising A Data Contract, A Network Location For The Table, And A Role For Accessing The Table ⟋ 802

Analyze The Request Details And Data Contract Information ⟋ 804

Create A Set Of Resources For Accepting Data For The Table ⟋ 806

Perform One Or More Test Validations On The Table Using Test Data ⟋ 808

900

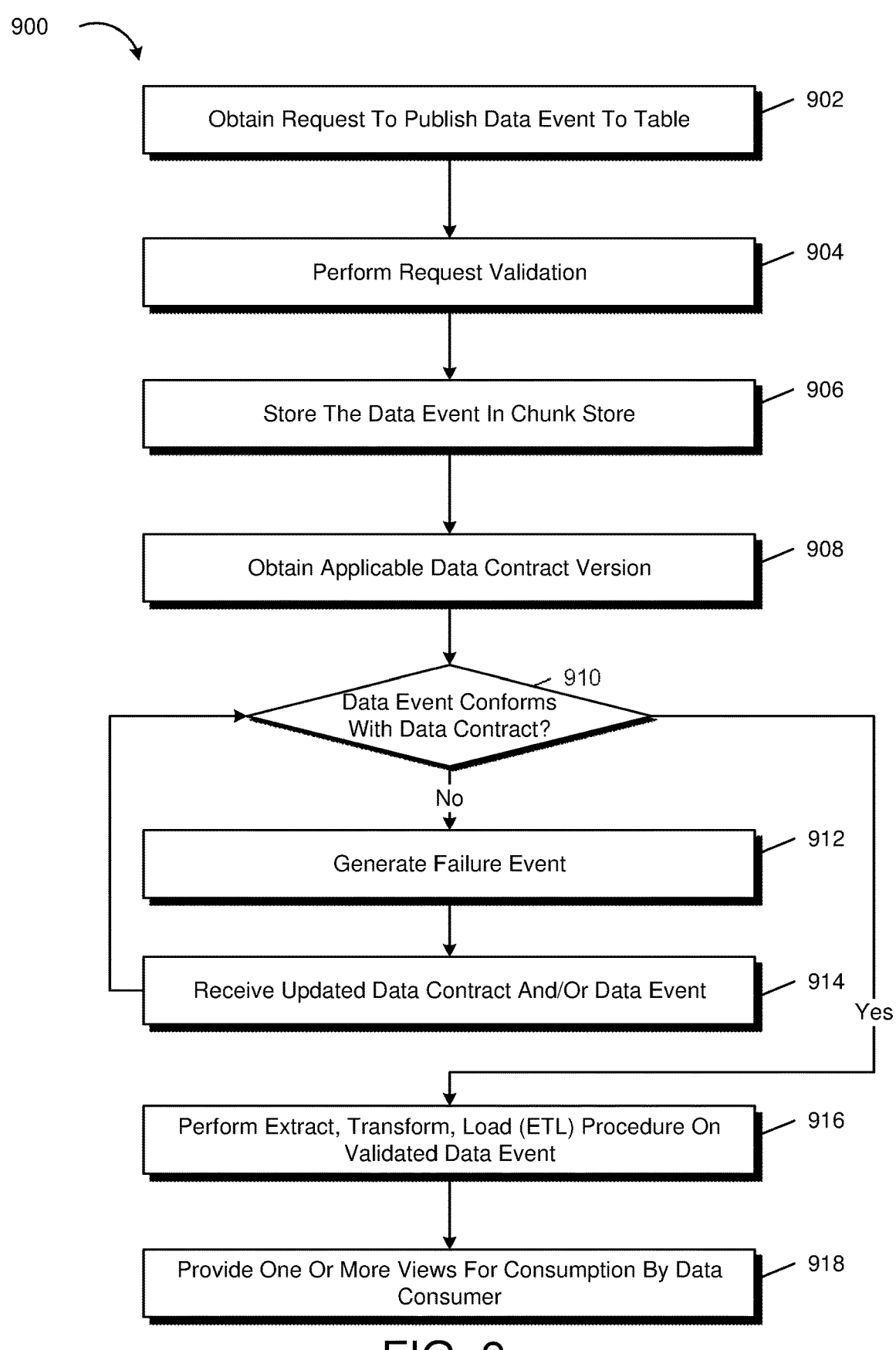

Obtain Request To Publish Data Event To Table — 902

Perform Request Validation — 904

Store The Data Event In Chunk Store — 906

Obtain Applicable Data Contract Version — 908

910
Data Event Conforms With Data Contract?

No

Generate Failure Event — 912

Receive Updated Data Contract And/Or Data Event — 914

Yes

Perform Extract, Transform, Load (ETL) Procedure On Validated Data Event — 916

Provide One Or More Views For Consumption By Data Consumer — 918

| 1002 | HARDWARE PROCESSOR |
| 1024 | INSTRUCTIONS |

1004 — MAIN MEMORY
1024 — INSTRUCTIONS

1006 — STATIC MEMORY
1024 — INSTRUCTIONS

1028 — SENSORS

1020 — NETWORK INTERFACE

1030 — ANTENNA(S)

GRAPHICS DISPLAY DEVICE — 1010

INPUT DEVICE — 1012

UI NAVIGATION DEVICE — 1014

STORAGE DEVICE — 1016
MACHINE-READABLE MEDIUM — 1022
INSTRUCTIONS — 1024

SIGNAL GENERATION DEVICE — 1018

DATA INGESTION SUBSYSTEM — 1036

POWER DEVICE — 1032

1008

OUTPUT CONTROLLER — 1034

1026 — COMMUNICATIONS NETWORK

MANAGEMENT OF DATA EVENTS IN A DATALAKE ENVIRONMENT USING DATA CONTRACTS

BACKGROUND

While there are many benefits to using datalakes, there are also many challenges involved in using them. For example, many datalakes can experience data quality issues that impact the operation of datalakes. For example, when a data quality issue is made known, several issues may arise. First, data quality detection may be reactive, meaning that the problem is detected after it has occurred. Second, multiple entities may be involved in the investigation of data quality issues—a data warehouse team may be the single point of entry for all issues and may be required to investigate data quality issues even when the issues are not their fault. For example, a data warehouse team may be tasked with investigating a data quality issue, determine that the data quality issue arose from the inflow of malformed data, and then contact the data producer to correct the data. Third, the process to correct data quality issues may be slow and require ad hoc support in order to fix the data quality issue.

BRIEF DESCRIPTION OF THE DRAWINGS

FIG. 9 shows an illustrative example of a process 900 for processing a data event according to a data contract, in accordance with one or more example embodiments of the present disclosure.

Figure 1:
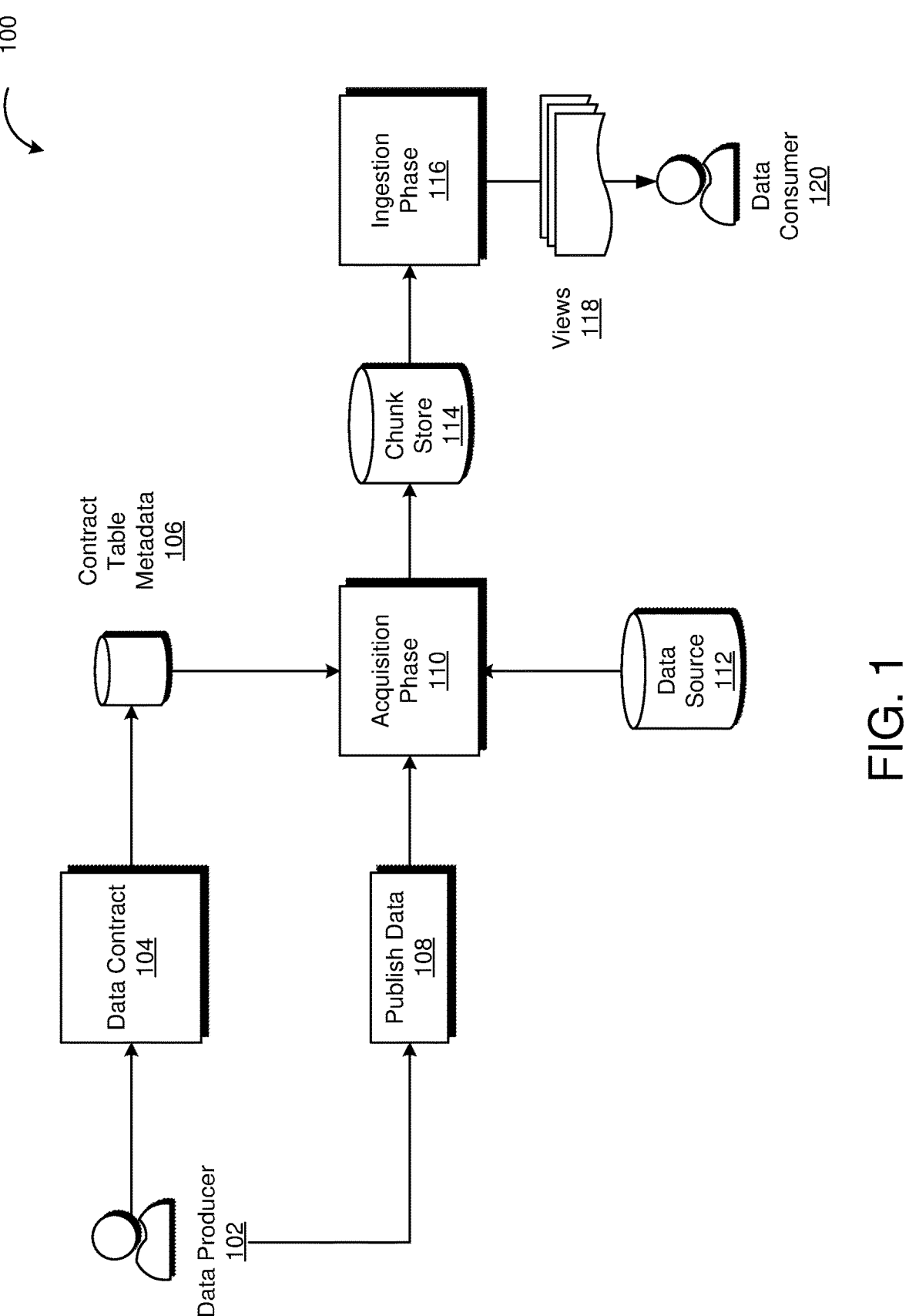
FIG. 1 illustrates an environment in which a data ingestion service is implemented, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for data ingestion service for data lakes. Techniques described herein may be used to decouple data acquisition from data ingestion to reduce dependencies within a data lake environment, reduce or need for coordination by data producers with downstream data consumers, and allow for self-managing their schemas through versioning.

One aspect described herein relates to techniques that decouple data acquisition from data ingestion. Data acquisition may refer to the process of collecting data from a data source in its native format, aggregating the data in chunks, and storing in an intermediate versioned data chunk store. Data ingestion may refer to the process of reading the data from the chunk store, converting it into a tabular schema, and formatting the data in a way that is optimized for data lake workloads. Customers of a computing resource service provider may onboard their data sources by registering metadata about the source system in a data lake registry.

A data contract may refer to metadata used to capture information such as source data store type, schema definition, version, data format, data classification, roles that may need to be assumed to read the data, and so forth. A data contract may be used to enforce the integrity of data that is ingested and then subsequently processed. When a data event is written into a data ingestion service, it is validated against this contract. If a dataset fails to conform to the applicable data contract, then the validation is considered to have failed and the dataset may be sent back to the data producer for correction. A data provider can either correct the records to resend or create a new version of the data contract that conforms to data layout of failed records. However, if the dataset passes the validation, they are aggregated by their metadata version and stored in a version-controlled chunk store. Data ingestion process then captures these data sets from the chunk store, optimizes the storage format, applies them periodically into a data lake storage, and so forth.

Prior to applying the changes to the data lake, the data ingestion service performs data quality checks to ensure correctness of the incoming dataset. Finally, the data ingestion process registers the target metadata in a data catalog.

By decoupling the data acquisition from data ingestion, the data ingestion service allows source as well as target schemas to evolve independently with no impact to each other. The ingestion process is data driven, so the data is available in the data lake as soon as it is published, validated and data quality checks are complete.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an environment 100 in which a data ingestion service is implemented, in accordance with one or more example embodiments of the present disclosure.

FIG. 1 depicts an illustrative, non-limiting example architecture in which a data ingestion service may be implemented. In various embodiments, data acquisition and data ingestion are decoupled by using techniques described in connection with FIG. 1.

Data producer 102 may refer to a client computing entity that is used to perform metadata management functionality. Data producer 102 may be interface with a computing resource service provider via a dashboard, control panel, or other management systems related to the operation of a data lake. For example, a set of application programming interfaces (APIs) may be supported that allows data producers to register datasets, manage data sources, manage data contracts, and so forth. In various embodiments, data producer 102 uses APIs to manage data contracts that are used to validate the integrity of data inflows to a data lake. While various APIs and API signatures are described throughout this disclosure, they should be considered to be illustrative, non-limiting examples of APIs that may be used to implement various functionality described herein, and other suitable APIs and API signatures are contemplated within the scope of this disclosure.

In various embodiments, a data producer 102 generates or otherwise determines a data contract 104 that is used to perform contract validation. The data producer may submit, via an API gateway, various API requests to create a schema registry and/or create a contract table. The data contract may be stored in a contract table metadata store 106. A data contract may have a version number associated with it, which can be updated as the schema of datasets evolves over time. A set of table APIs may be used by a client computing entity (e.g., data producer 102) to interact with contract table metadata store 104 and managed various data contracts stored within contract table metadata store 104. For example, the data producer's data schema may change over time, and those changes can be reflected by updating the contract version stored in contract table metadata store 104 to reflect updates to the data producer's schema.

A data contact 104 may refer to a set of mandatory information that is bound to each data table within the context of a data ingestion service. A data contract 104 may be used to validate the correctness of data that is being fed into a data lake by a producer, and ensure that data not conforming to the data contract is rejected, which may prevent downstream failures that would occur by attempting to process data that does not conform to an expected schema. Accordingly, and in at least one embodiment, data producers are responsible both for defining a data contract and also ensuring that datasets they publish comply with an applicable data contract.

Contract table metadata store 106 may be implemented as any suitable system, and may be used to persist, access, update, or otherwise interact with data contracts. For example, data contracts may be stored in a database system or other structured data storage system. A contract table metadata store 104 may be accessed by clients and data ingestion service. In various embodiments, data producers will first register a data contract with the data ingestion service and then provide datasets to the datalake. Table creation and management may be performed in accordance with techniques described in connection with FIG. 8.

In various embodiments, data producer 102 uses a publisher API to publish data 108. Data may be published by, for example, specifying the network location where a data object can be found, such as in data source 112. The data object location may refer to a network location or resource name in the context of a computing resource service provider. The data source 112 may be a producer owned data source 112, such as a data object bucket managed or otherwise controlled by data producer in the context of a computing resource service provider.

A step functions workflow comprising an acquisition phase and an ingestion phase may be used to validate and publish datasets to a datalake environment that can be accessed by downstream data consumers. In various embodiments, acquisition phase 110 comprises various functionality, including steps to access a data event from data source 112, access a data contract 104 from contract table metadata 106, and validate whether the data event complies with the applicable data contract. Various types of validations can be performed during the acquisition phase 110. For example, a data size validation may be performed wherein the function reads or inspects the network location of the data object to ensure that the total size of the data object does not exceed the maximum content size specified in the contract. In various embodiments, the validation step involves determining the file format of the data object at the network location. For example, the data contract may specify a particular format, such as a *.CSV file is expected, and the data object may be inspected to determine whether it has an allowable file extension according to the data contract. In various embodiments, a schema validation is performed to ensure that the schema of the dataset being processed complies with an expected schema format defined in the data contract.

If the validation step fails, it may indicate that the data event is invalid. If the validation step fails for any reason, a failure event may be generated. The failure event may be written to a message queue managed by a message queuing service where the data producer 102 can retrieve and inspect failure events.

In some embodiments, the data producer 102 corrects the error by modifying the data to conform to the existing data contract (e.g., ensuring that the data conforms to the expected schema) and then invokes an API to publish the updated data or the resubmit with new data. This resubmission may be used to resume execution of the acquisition phase, which will move to a retry function that attempts to retry execution of the workflow and process the updated data by performing the validation step against the updated data. Retry function may be implemented as a serverless compute function within the context of the step functions workflow that attempts to invoke the validate data step with the updated data event and/or updated data contract.

In some embodiments, the data producer 102 corrects the error by modifying the data contract. The data contract is used to control various aspects of the validation step, including the expected table size, format, and schema. A table/contract API may be used to submit an updated data contract, and may be used to resume execution of the acquisition phase, which will move to a serverless compute function that attempts to retry execution of the workflow and process the same data by performing the validation step against the updated data contract.

Regardless, once the validation step succeeds, a validated data event may be persisted to chunk store 114. Chunk store may refer to an intermediary store implemented as a key value store or other types of structured storage. Successful data events persisted to chunk store 114 may be used by the downstream ingestion phase 116 of the step functions workflow.

In various embodiments, validated events written to chunk store 114 by the acquisition phase 110 are obtained during the ingestion phase 116 to perform an extract, transform, load (ETL) procedure. The details may include, for example, the data event, an identifier or reference to where the data event is stored in the chunk store, the data contract version that the data event is being processed under, and so forth. In various embodiments, the ETL procedure performed on the data event is implemented as a serverless data integration service job. In various embodiments, the ETL job maps the source schema to a target schema and may, in some cases, include audit columns. Data to be transformed may be obtained from obtained from a raw data store (producer owner) and/or raw data store (service owned), which may be implemented as described in connection in FIG. 5. The processed data may be loaded into a processed data object bucket or other suitable data store for persisting the transformed data. The processed data object bucket may be owned by the data ingestion service. On completion, the status may be emitted to chunk store 114. The status may be used to update the chunk store 114.

In various embodiments, data producer 102 can update the data contract 104 to reflect any data source changes (e.g., schema changes) as well as the base view definition that acts as the interface for consumers to read the data. Views 118 may be generated according to the data producer's base view definitions. Data consumers may register their own views, which can be generated from different data producer owned base views, such as base view and/or base view.

Various technical advantages may be realized by implementing a data ingestion service in accordance with the techniques described herein. There are many data quality issues that can be encountered in a datalake environment, including but not limited to reactive detection of data quality issues, data quality issues are directed to data warehouse team even when it is not their fault, and slowness in correcting data quality issues as fixes are performed on an ad hoc basis. With architectures described herein, data contracts can be used to proactively-rather than reactively-detect when data quality breaches occur by shifting the detection of issues at the time of data published rather than data consumed. Data producers are directly notified of data issues. Data producers can submit corrected data ad hoc so that data quality issues are resolved immediately. Data producers are able to correct data quality issues on-demand by using the table APIs to either send updated data that conforms to the applicable data contract, or amend the data contract to allow for the data to be accepted.

Figure 2:
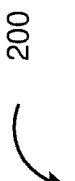
FIG. 2 illustrates a computing environment in which data contracts are implemented, in accordance with one or more example embodiments of the present disclosure.

FIG. 2 illustrates a computing environment 200 in which data contracts are implemented, in accordance with one or more example embodiments of the present disclosure.

Data contract table 202 may refer to a data store in which data contracts are stored. Data contracts may be stored in a key-value store that is implemented using a non-relational database, such as a No-SQL-based database system. Data contract store may be implemented to store various data contract records, such as data contract 204 depicted in FIG. 2.

Data contract 204 may comprise various components, such as a partition key 206, metadata 208, contract versions 210, and consumers 212. A primary key may comprise partition key 206 and a sort key. Partition key 206 may encode or otherwise include an owner identifier (e.g., of the data producer) and dataset identifier. As an example, the primary key may be defined as:

OWNER#<OwnerId>#<DatasetId>

Sort keys may be determined based on the item type. For example, each data contract may be created with metadata 208. Metadata 208 may comprise various information that pertains to a dataset that applies across contract versions. A data contract's metadata 208 may comprise one or more of the following fields: contract name, category, type, and item (CTI) information, tags (e.g., billing, prevention, or other uses), and various combinations thereof. The sort key for the metadata record of a data contract may be defined as:

METADATA #<OwnerId>

A data contract 204 may comprise one or more contract versions 210. A contract version may refer to a binding contract as to the types of data events that are to be expected. For example, each contract version may specify a version, dataset name, source, schema, owner, creation time, and so forth. In various embodiments, the first version of a contract is initially created as version 1, and subsequent versions increase monotonically. The sort key for a contract version may be defined as:

CONTRACT #<Version>

In some embodiments, the first contract version is v1, the next contract version is v2, and so on and so forth. As an optimization, the current data contract version is stored in a record that is referenced as CONTRACT #v0 for ease of access. For example, if a data contract is created with an initial contract version, the contents of the CONTRACT #v1 (the initial data contract) is duplicated in CONTRACT #v0. Later, if a new contract version supersedes the initial contract, then a new contract record for CONTRACT #v2 is created and the contents of CONTRACT #v0 is updated to reflect the contacts of the latest contract version. Accordingly, the current version of a data contract that should be used to validate data events can be accessed at CONTRACT #v0 regardless of how many revisions have occurred, according to at least one embodiment of the present disclosure.

Data contract 202 may further comprise information regarding data consumers 212. Example fields that may be stored in association with data consumers may include, for example, CTI information. The sort key for a data consumer may be defined as:

CONSUMER #<ConsumerId>

Additional data contracts may be stored in data contract table 202. For example, data contract 204 may be stored in data contract table 202, as well as data contract 214, and so forth. Each data contract may be identified through a unique identifier. For example, data contract 214 may have a different partition key from partition key 206.

In some embodiments, a single table design is implemented to facilitate access and management of data contract information. Various capabilities may be implemented or otherwise supported by contract table 202. Functionality to access or manage data contracts may be accessible via an API gateway that exposes table and/or contract APIs. For example, a client may submit an API request to retrieve a contract and all corresponding information. This may be implemented as a query on the partition key where PK=OWNER#<OwnerId>#<DatasetId>. In various embodiments, the current data contract can be retrieved using a query on the PK where PK=OWNER#<OwnerId>#<DatasetId> AND SK=CONTRACT#v0. In various embodiments, an API may be used to obtain all data consumers for a contract PK where PK=OWNER#<OwnerId>#<DatasetId> AND begins_with (SK. "CONSUMER #"). In various embodiments, all versions for a contract can be retrieved on the PK where PK=OWNER#<OwnerId>#<DatasetId> AND begins_with (SK, "CONTRACT #"). In various embodiments, an API may be used to retrieve all contracts for an owner SCAN AND FILTER on begins_with (PK, "OWNER#<OwnerId> #").

Advantages of approaches that utilize the techniques described above include the ability to issue a single query to get all the information that a client needs for a contract, the ability to easily retrieve the latest contract (query for SK beginning with "CONTRACT #v0"), and that metadata, consumers and versioned data (contract) are decoupled and can evolve separately from each other.

In at least one embodiment, data producer refers to a client of a computing resource service provider that provides datalake capabilities. The data producer may invoke an API, such as a PublishData( . . . ) API to publish data. The API may include information usable to identify a specific table, and information to identify data to publish. The data may be encoded directly in the API, a network location (e.g., to a data object file location) may be specified in the API, and so forth. The API may be submitted to a computing resource service provider, authenticated and/or authorized, and routed to a data ingestion service.

As described above, there is merely one illustrative, non-limiting example of how data contract 202 may be implemented. As another example, the partition key may be defined simply with the owner identifier and each sort key is prefixed with the dataset identifier.

Primary Key:
    OWNER#<OwnerId>

Sort Key:
    <DatasetId>#METADATA#<OwnerId>
    <DatasetId>#CONTRACT #<Version>
    <DatasetId>#CONSUMER#<ConsumerId>

One of the advantages to this implementation technique is that there is no need to scan and filter to get all contracts for an owner.

As yet another possible implementation, the owner information can be removed entirely from the partition key and instead use the contract identifier as the partition key. The owner information may be stored as a field and a global secondary index (GSI) may be applied to the owner field to allow for retrieval of all contacts by owner.

Primary Key:
    CONTRACT#<DatasetId>

Sort Key:
    METADATA#<DatasetId>
    CONTRACT#<Version>
    CONSUMER#<ConsumerId>

A data ingestion service may perform an initial request validation and, upon successful initial validation of the request, invoke a serverless compute function that performs initial processing of the data event. It should be noted that initialization of the request is separate and distinct from validation of the data, which is described further below, as a distinct step separate from the initial validation of the request.

In various embodiments, the request is inspected to perform an initial data size check. For example, if a network location is specified in the API request, the serverless compute function may attempt to access the network location. In some embodiments, the API specifies a role to assume for accessing the network location. If the serverless compute function is unable access a data object—for example, because the network location does not refer to a valid file or because permissions are not sufficient to access the file—then a failure has occurred and a failure response may be provided to the data producer either synchronously or asynchronously.

In various embodiments, the size of the data file may be used to determine whether a synchronous or synchronous response should be returned to the data producer.

If the request comprises the data payload, then the serverless compute function may invoke a prioritized step functions workflow to perform a low-latency acquisition and ingestion of the data into the datalake. The payload may be written into a temporary data bucket that network location may be provided to the step functions workflow for acquisition and ingestion. Accordingly, in either the case where a network location is specified in the request or a payload is directly encoded in the request, the step functions workflow is able to operate against a network location.

The initial event may be recorded into a chunk store, for example, using a key-value store, and events with the same published time may be sequenced. Events may be sequenced to preserve the ordering in which they are received. A response to the request may be generated. If the request is being processed synchronously (e.g., file size is below a threshold), then the response may be provided when the request is fully processed and successfully ingested into the datalake (or a failure at any point therein). If the request is being processed asynchronously, then the response may be provided based on the request's acquisition and ingestion execution being successfully initiated.

Figure 3:
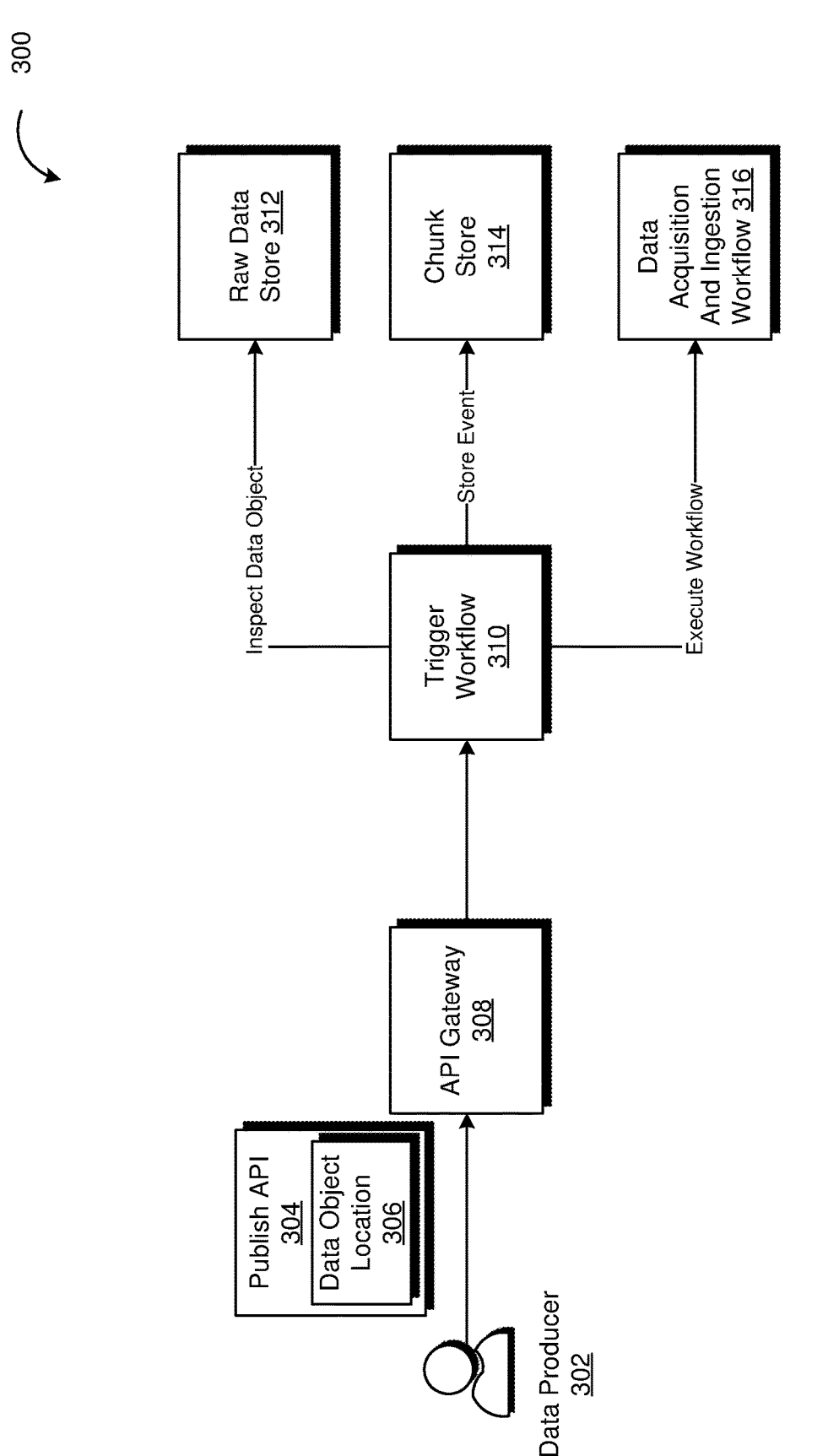
FIG. 3 illustrates a computing environment in which a data event comprising a data object location is published and processed by a data ingestion service, in accordance with one or more example embodiments of the present disclosure.

FIG. 3 illustrates a computing environment 300 in which a data event comprising a data object location is published and processed by a data ingestion service, in accordance with one or more example embodiments of the present disclosure. Embodiments described in connection with FIG. 3 may be implemented in the context of FIGS. 5-6.

Data producer 302 may invoke a publish API 304 that includes or otherwise encodes a data object location 306. The data object location 306 may refer to a network location or resource name in the context of a computing resource service provider. The publish API 304 may indicate a table or dataset where the data event should be published. The publish API may be received via an API gateway 308 that performs initial request validation. If the validation succeeds, the service may trigger workflow 310. In various embodiments, incoming publish events are sent to a message buffer. A data producer may, for example, publish a data event (e.g., pushes a message) to a topic and a consumer of the topic pulls the message for processing. The workflow may be implemented as a serverless compute function. The serverless compute function may authorize and/or authenticate the caller. After successful authorization, the serverless compute function may perform initial processing. Raw data store 312 may refer to a data storage system where data object location 306 may be accessed. In some embodiments, publish API 304 includes a role that is to be assumed to access the data object. The data object may be inspected to determine the data size of the event. In some embodiments, the data size of the event is used to determine whether a response to the publish API 304 will be synchronous or asynchronous. In some embodiments, the function is executed synchronously, depending on the size of the data. For example, if the data is smaller than a threshold size, the function may synchronously wait for validation and publish steps to be completed before returning a response. However, if the data is larger than the threshold size, then a response may be immediately returned after attempting to execute the acquisition and ingestion workflow, indicating that the request has been queued for execution and that a result may be provided asynchronously upon completion of the step functions workflow.

In various embodiments, the initial event is then recorded in chunk store 314. Chunk store 314 may be implemented using a non-relational database. For example, chunk store 314 may be implemented as a key-value store. In various embodiments, data events with the same publish time will be sequenced to preserve ordering of events as they are received. Once the data event has been written to the chunk store 314, a data acquisition and ingestion workflow 316 may be executed. The data acquisition and ingestion workflow 316 may be implemented as a step functions workflow and described in accordance with FIGS. 5-6. Data acquisition and ingestion workflow 316 may be provided with the data object location of the data event stored in the chunk store 314.

Figure 4:
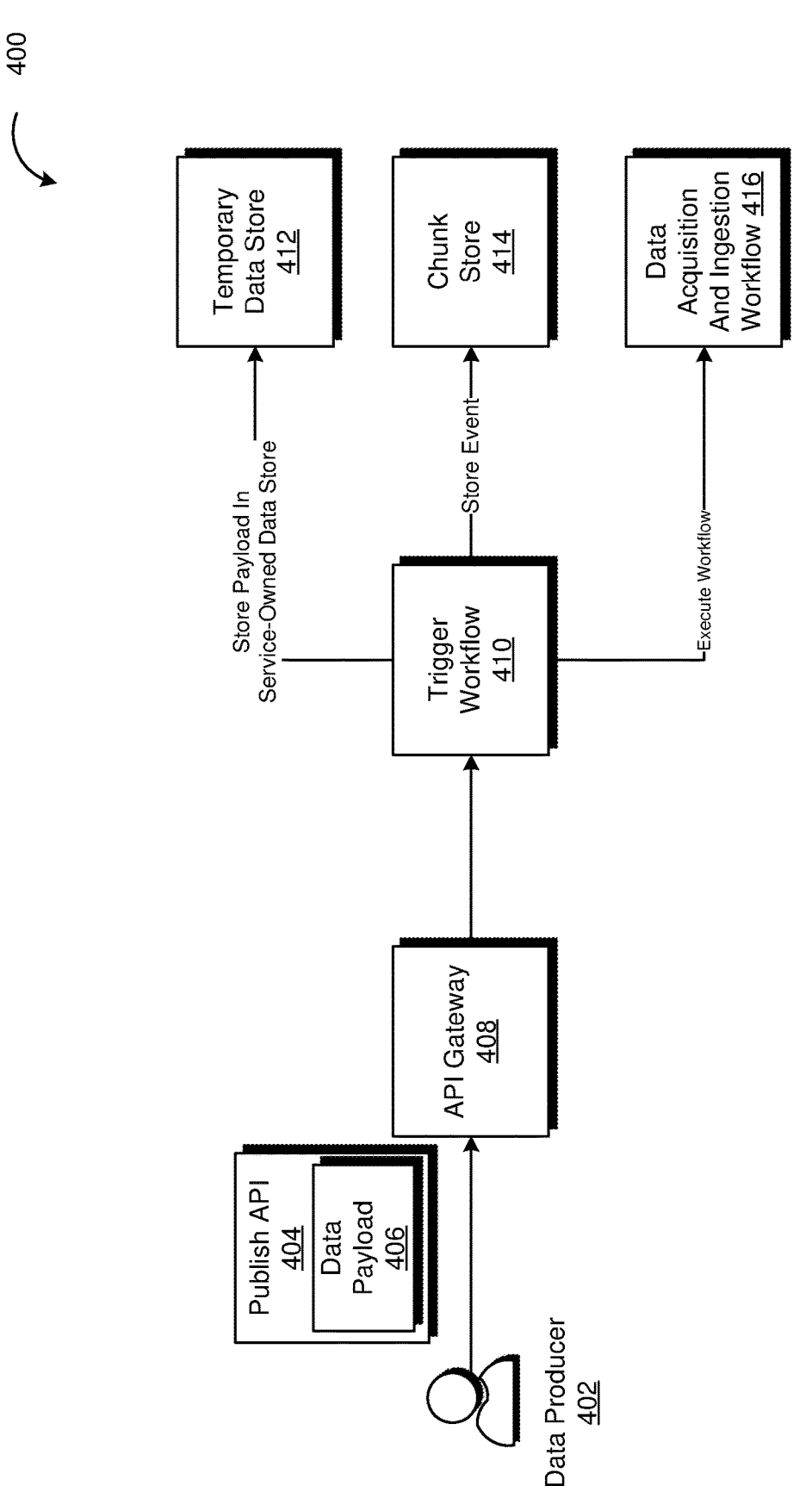
FIG. 4 illustrates a computing environment in which a data event comprising a data payload is published and processed by a data ingestion service, in accordance with one or more example embodiments of the present disclosure.

FIG. 4 illustrates a computing environment 400 in which a data event comprising a data payload is published and processed by a data ingestion service, in accordance with one or more example embodiments of the present disclosure. Embodiments described in connection with FIG. 4 may be implemented in the context of FIGS. 5-6.

Data producer 402 may invoke a publish API 404 that includes or otherwise encodes a data payload 406. In some embodiments, publish API 404 allows the user to specify whether the data is encoded as a data payload 406 or a data object location, for example, as depicted in FIG. 3. The publish API may allow a data type to be specified in the API signature. The publish API 404 may have a maximum size, which provides an upper limit to the size of data payload 406. The publish API 404 may indicate a table or dataset where the data event should be published. The publish API may be received via an API gateway 408 that performs initial request validation. If the validation succeeds, the service may trigger workflow 410. In various embodiments, incoming publish events are sent to a message buffer. A data producer may, for example, publish a data event (e.g., pushes a message) to a topic and a consumer of the topic pulls the message for processing. The workflow may be implemented as a serverless compute function. The serverless compute function may authorize and/or authenticate the caller. After successful authorization, the serverless compute function may perform initial processing. Temporary data store 412 may refer to a data storage system where the service is able to persist in the data payload. Temporary data store may be a service-owned data store.

In various embodiments, the data event is then recorded in chunk store 414. Chunk store 414 may be implemented using a non-relational database. For example, chunk store 414 may be implemented as a key-value store. In various embodiments, data events with the same publish time will be sequenced to preserve ordering of events as they are received. Once the data event has been written to the chunk store 414, a data acquisition and ingestion workflow 416 may be executed. The data acquisition and ingestion workflow 416 may be implemented as a step functions workflow and described in accordance with FIGS. 5-6. Data acquisition and ingestion workflow 416 may be provided with the data object location of the data event stored in the chunk store 414.

Figure 5:
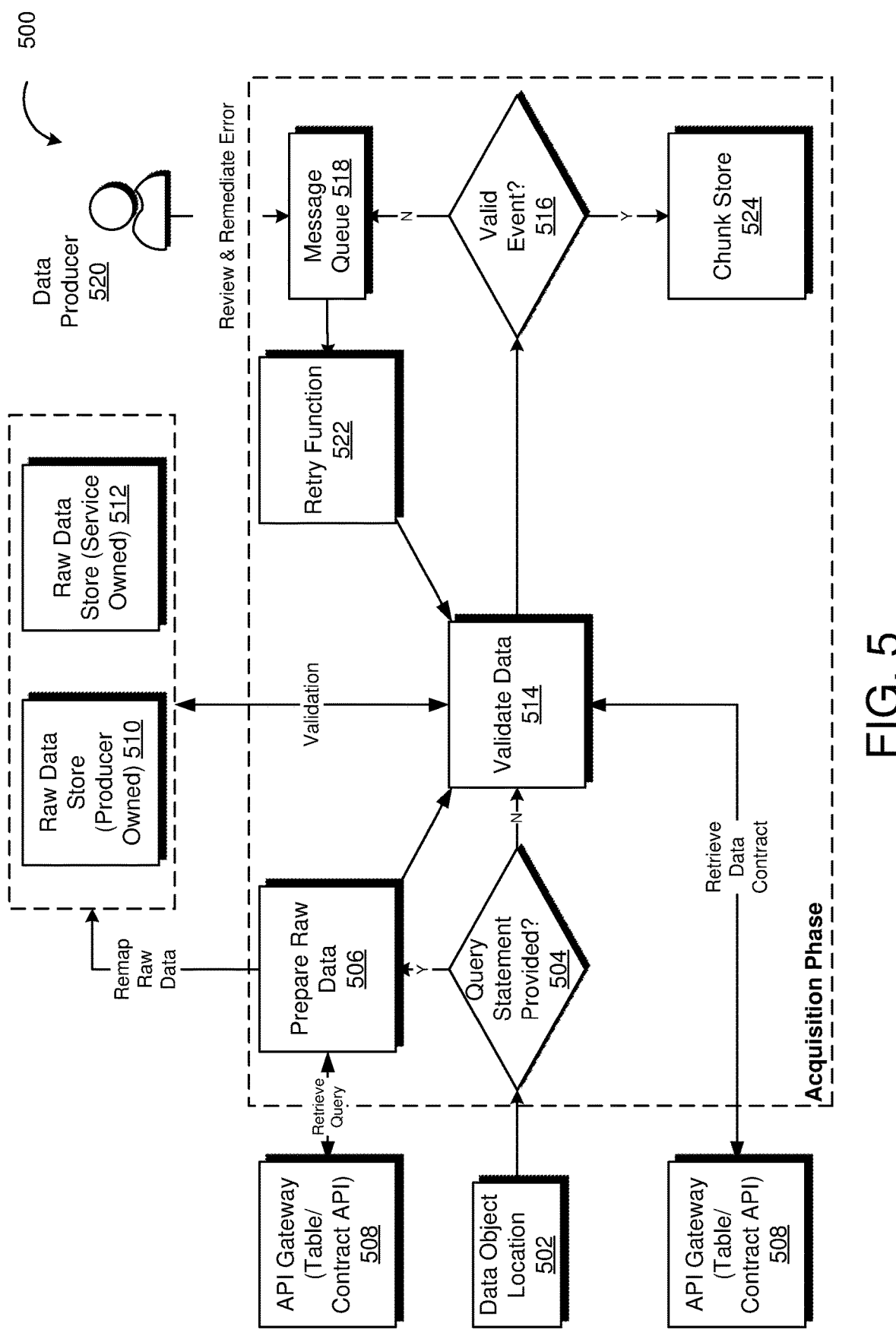
FIG. 5 illustrates a computing environment in which an acquisition phase of a data event processing workflow is implemented, in accordance with one or more example embodiments of the present disclosure.

FIG. 5 illustrates a computing environment 500 in which an acquisition phase of a data event processing workflow is implemented, in accordance with one or more example embodiments of the present disclosure. Embodiments described in connection with FIG. 6 may be implemented in the context of FIG. 5.

A step functions workflow may be triggered to perform acquisition and ingestion phases for the data. A data object location 502 may provide the step functions workflow with a reference to a location where a data event to be processed is stored. A system performing the acquisition phase of the step functions workflow may obtain the applicable data contract for the data event and determine whether 504 a query statement was supplied as part of the data contract. The query statement may be written in PartiQL or another SQL-compatible query language and may be obtained via an API gateway 508. If a query statement exists, a function may use the query statement to prepare the raw data 506. For example, the raw data 506 may be obtained from raw data store (producer owner) 510 and/or raw data store (service owned) 512. The data store that is accessed may depend on how the data event was published—for example, if a data payload is published, then the data payload may be stored in a temporary data store owned by the ingestion service. The query statement may be used to remap raw data into a modified raw data format that is then placed in a bucket owned by the data ingestion service. The mapped raw data may be used in downstream steps. The query statement may be used, in various embodiments, for data with complex structures like JSON to allow the producer to specify a query statement that maps a source schema to the target schema.

A validate data 514 step may be performed to determine whether the data event complies with an applicable data contract. In various embodiments, the validation step is performed as a serverless compute function that is executed as part of a step functions workflow. The validation function may use the table details and caller identity to call a table API via API gateway 508 for obtaining the data contract information. For example, a contract table API may be invoked to obtain the applicable data contract information. Data contract validation may perform various validations using data events obtained from raw data store (producer owner) 510 and/or raw data store (service owned) 512. For example, a data size validation may be performed wherein the function reads or inspects the network location of the data object to ensure that the total size of the data object does not exceed the maximum content size specified in the contract.

In various embodiments, the validation step involves determining the file format of the data object at the network location. For example, the data contract may specify a particular format, such as a *.CSV file is expected, and the data object may be inspected to determine whether it has an allowable file extension according to the data contract. In various embodiments, a select command is used to perform schema validation.

A determination may be made as to whether 516 the data event is valid. If the validation step fails for any reason, a failure event may be generated. The failure event may be written to a message queue 518 managed by a message queuing service where the data producer 520 can retrieve and inspect failure events. The failed event may be generated with a task token. The failure event may indicate one or more reasons for failure, such as the data being too large, the data being in an incorrect format, a schema validation failure, and so forth. The data producer may read the failed event from the message queuing service and provided with an opportunity to remediate the failure. In some embodiments, the acquisition phase is paused to allow for the data producer to determine an appropriate remediation. For example, a data producer may retrieve the failure event, determine a cause of failure, and then determine how to correct the error.

In some embodiments, the data producer corrects the error by modifying the data to conform to the existing data contract (e.g., ensuring that the data conforms to the expected schema) and then invokes an API to publish the updated data or the resubmit with new data. This resubmission may be used to resume execution of the acquisition phase, which will move to a retry function 522 that attempts to retry execution of the workflow and process the updated data by performing the validation step against the updated data. Retry function 522 may be implemented as a serverless compute function within the context of the step functions workflow that attempts to invoke the validate data 514 step with the updated data event and/or updated data contract.

In some embodiments, the data producer corrects the error by modifying the data contract. The data contract is used to control various aspects of the validation step, including the expected table size, format, and schema. A table/contract API may be used to submit an updated data contract, and may be used to resume execution of the acquisition phase, which will move to a serverless compute function that attempts to retry execution of the workflow and process the same data by performing the validation step against the updated data contract.

The validation step may be repeated multiple times if updates to data and/or data contract still does not result in the validation step succeeding. Assuming that the validation step succeeds, the data event is updated in the chunk store 524 to indicate that the acquisition step completed successfully. In the acquisition phase of the step functions workflow, incoming data from data producer is collected and validated, and then persisted in an intermediary store that is referred to as chunk store 522. The chunk store 522 may be implemented as a key value store or other types of structured storage. Successful data events persisted to chunk store 522 may be used by the downstream ingestion phase of the step functions workflow.

In various embodiments, the data event may be sequenced, for example, when there are other events with the same publish time. If this is the case, the system may check to ensure that any previous data events (if they exist) with the same publish time were ingested to data lake. If any previous data events in the sequence have not yet been ingested, then the step function execution is paused until the previous data event concludes ingestion, at which point the current data event may be processed to ensure that the data lake acquires the data events in the specified sequence. Once the data event has been ingested in the chunk store 522, the acquisition phase of the step functions workflow is considered complete, and may proceed to an ingestion phase. An ingestion phase that follows an acquisition phase may be implemented in accordance with techniques described in connection with FIG. 6, as described in greater detail in the sections that follow.

Figure 6:
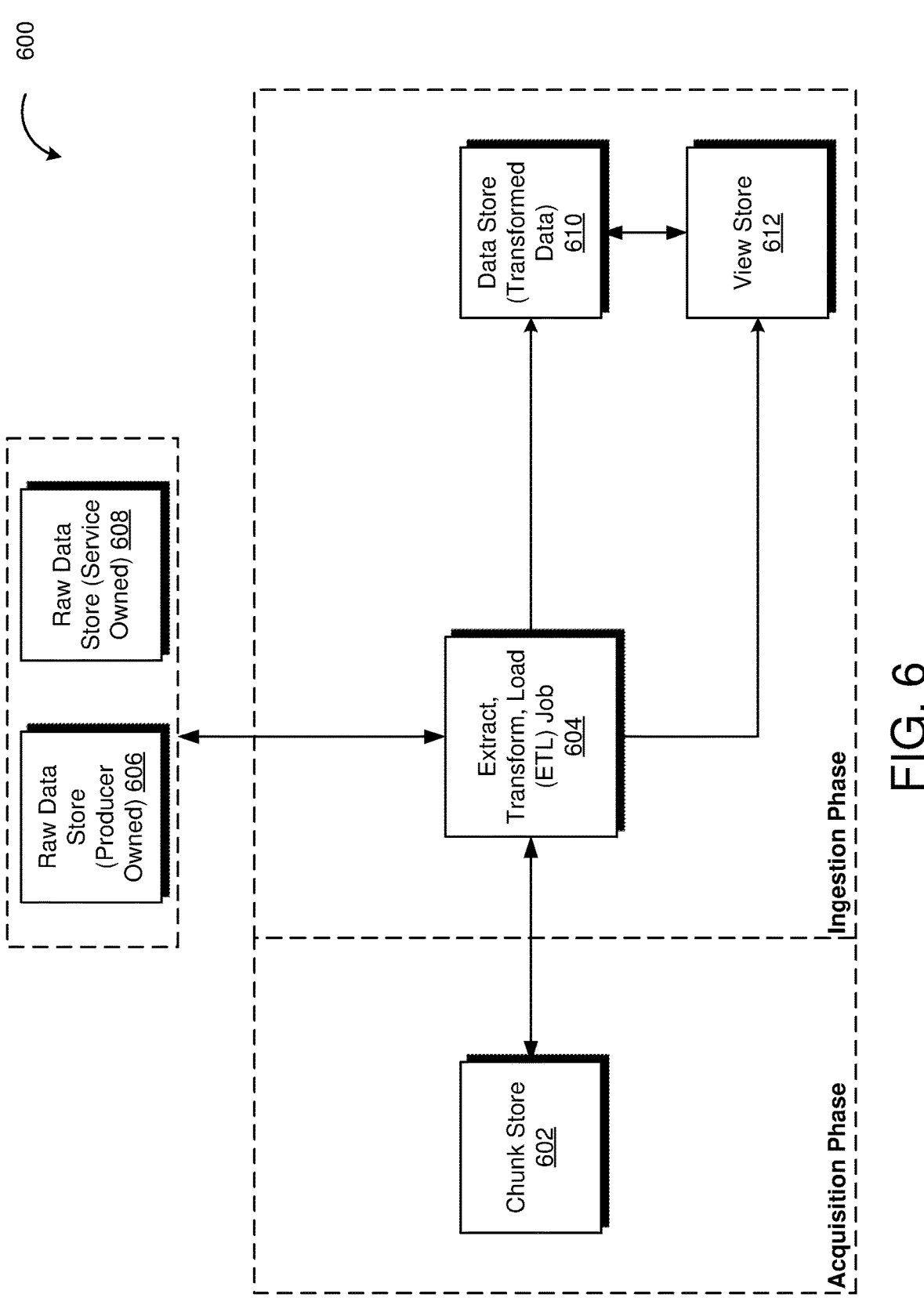
FIG. 6 illustrates a computing environment in which an ingestion phase of a data event processing workflow is implemented, in accordance with one or more example embodiments of the present disclosure.

FIG. 6 illustrates a computing environment 600 in which an ingestion phase of a data event processing workflow is implemented, in accordance with one or more example embodiments of the present disclosure. Embodiments described in connection with FIG. 5 may be implemented in the context of FIG. 6.

In various embodiments, during the acquisition phase of the step functions workflow, incoming data from data producer is collected and validated, and then persisted in an intermediary store that is referred to as chunk store 602. In various embodiments, the acquisition phase depicted in FIG. 6 is implemented using techniques described in connection with FIG. 5. For example, chunk store 602 may be implemented as the chunk store described in connection with FIG.

5. When a data event is persisted to the chunk store 602, the acquisition phase is considered to be complete, and the step functions workflow may then proceed to the ingestion phase depicted in FIG. 6.

In various embodiments, event details from a previous step of a step functions workflow is passed from acquisition step to ingestion step to perform an extract, transform, load (ETL) procedure, which is depicted in FIG. 6 as ETL job 604. The details may include, for example, the data event, an identifier or reference to where the data event is stored in the chunk store, the data contract version that the data event is being processed under, and so forth. In various embodiments, the ETL procedure performed on the data event is implemented as a serverless data integration service job. In various embodiments, the job maps the source schema to a target schema and may, in some cases, include audit columns. Data to be transformed may be obtained from obtained from raw data store (producer owner) 606 and/or raw data store (service owned) 608, which may be implemented as described in connection in FIG. 5. The processed data may be loaded into a processed data object bucket or other suitable data store 610 for persisting the transformed data. When transformed data is written to data store 610, it may trigger one or more views in view store 612 to be updated. View store may refer to one or more views in which the transformed data is mapped to. These views may include a base view with a one-to-one mapping between the table and the view, as well as other views with target schemas that are defined by data consumers. In various embodiments, a plurality of views—which can each have a different target schema—are updated based on updates data store 610. In some cases, updates are processed in batches, such that multiple successive changes to data store 610 result in a view being updated once to apply all of the changes in aggregate. The processed data object bucket may be owned by the data ingestion service. On completion, the status may be emitted to chunk store 602. The status may be used to update the chunk store 602. In various embodiments, the emitted status may be used to signal the completion of the processing of a first data event, which may be used to trigger or resume the execution of a second data event, for example, in the case where the first data event and the second data event are sequenced data events with the same publish time.

Figure 7:
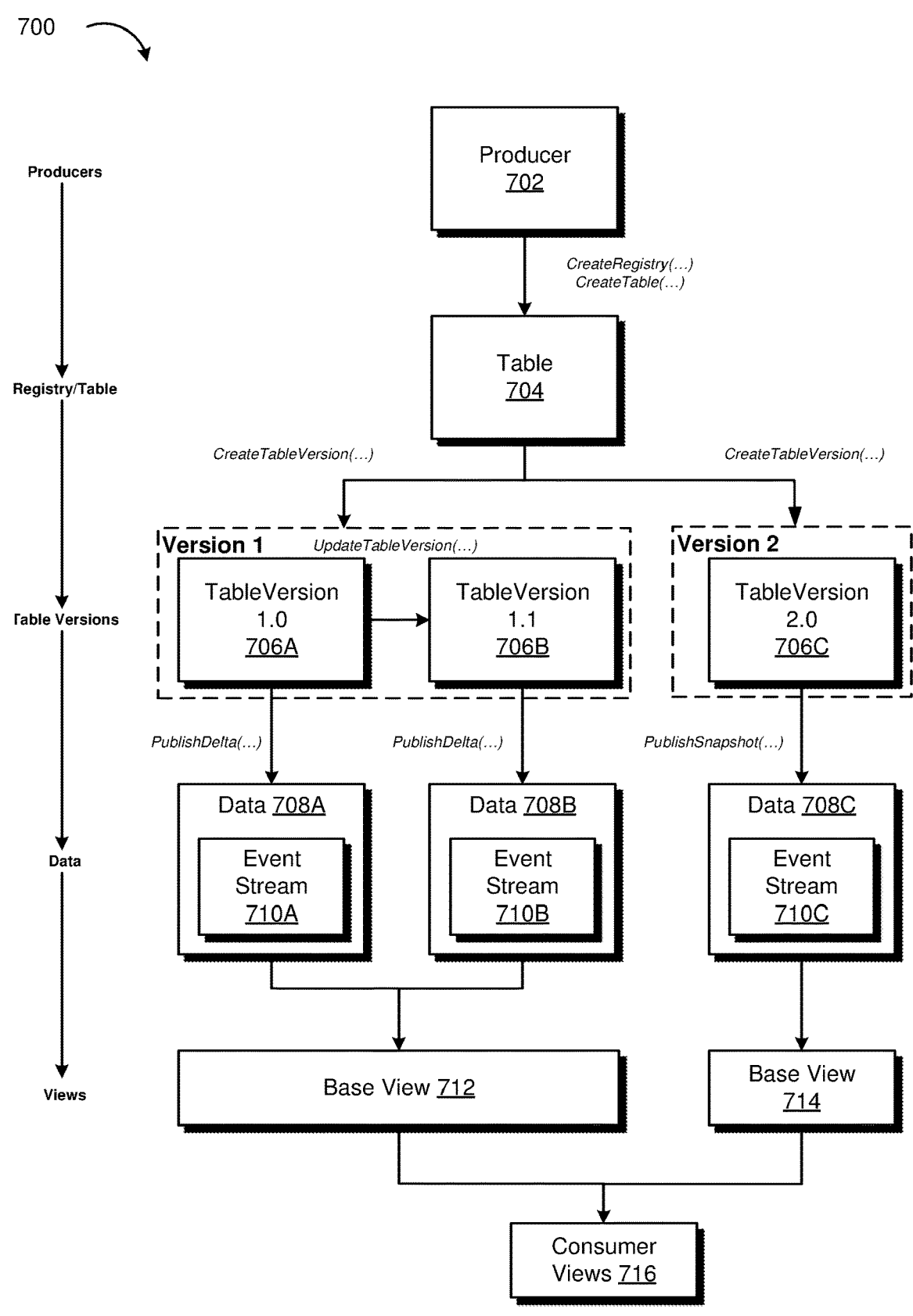
FIG. 7 Illustrates a diagram in which producers are able to self-manage datalake tables, in accordance with one or more example embodiments of the present disclosure.

FIG. 7 Illustrates a diagram 700 in which producers are able to self-manage datalake tables, in accordance with one or more example embodiments of the present disclosure. Data producers may have the ability to update the data contract to reflect data source changes, such as schema changes. Additionally, in various embodiments, data producers manage the base view definition, which acts as an interface for data consumers to read the data.

In various embodiments, a data producer 702 is able to self-manage schema evolution. In various embodiments, a data ingestion service allows producers to maintain one or more versions of a data table. A data producer 702 is able to create data table 704. Data producer 702 may first create a schema registry and then create a table.

A schema registry may refer to a feature that enables discovery, control, and evolution of data stream schemas. A schema defines the structure and format of a data record, according to various embodiments. Schema registry APIs such as a CreateRegistry( . . . ) may be used to manage and enforce schemas on data streaming applications using convenient integrations with computing resources such as distributed event store and stream-processing platforms, managed streaming platforms, serverless data streaming service, data analytics platforms, serverless compute services, and more. The schema registry may be defined in any suitable data format, for example, AVRO-based data formats, JSON-based data formats, and so forth. In various embodiments, the schema registry is applied to data producers and ensures that is used to improved data governance and allows disparate systems to share a schema for serialization and de-serialization. A table may be created through a CreateTable ( . . . ) API. Create, update, delete, and retrieve operations may be supported on tables.

Data contracts may belong to a single dataset in a 1:1 relationship. Data contracts may be versioned and qualifying updates to a contract (e.g., according to the schema registry) result in generation of a new contract version. Data contracts may be backwards compatible and can be rolled back to a previous version.

A table version may be created using a CreateTable Version( . . . ) API. A table may be created with an initial schema. For example, table version 706A may be created as an initial version 1.0 of a table. Data 708A may be used to record event stream 710A via according to a data contract corresponding to table version 706A. For example, table version 706A may specify a schema in which data events should conform.

In various embodiments, the data contract may evolve over time. For example, table version 706A may be updated or modified via an UpdateTableVersion( . . . ) API that is used to update the table to a new minor version, indicated as version 1.1 in FIG. 7. When updating a table version, the schema may be considered a minor update when the new schema is backwards compatible with the old schema.

The data contract may be updated, via an UpdateTable-Version( . . . ) API, which may be used to update the data schema to table version 706B. The schema update may be a backwards compatible update, for example, the addition of a new field to the schema. An example of a change that is not backwards compatible is a change that removes a field.

When a data table undergoes a schema change, the data producer can register the change with the data ingestion service. Once the data contract has been updated, data events according to the updated schema can be published to the datalake. In various embodiments, schema updates are required to be backwards compatible. In various embodiments, a data producer supplies a new schema that is backwards compatible with the previous schema, and the minor version of the table is updated and the schema update occurs in place. This is depicted in FIG. 7 as the update from version 1.0 to version 1.1, and may involve updating the base view in a manner that is backwards compatible with the previous schema. Once the schema has been updated, new data events can be written to data 708B. Data 708B may be used to record event stream 710B via according to a data contract corresponding to table version 706B.

Because table version 706A and table version 706B are compatible, a common base view 712 may be shared between the two. Base view 712 may be provided by the data producer at the time of table registration, and may be defined as a one-to-one mapping between the table and view. Data consumer views 716 may be separately owned and managed by data consumers. Data consumers may register their own views, which can be generated from different data producer owned base views, such as base view 712 and/or base view 714.

In some embodiments, data producers may wish to make schema updates that break backwards compatibility. If no such view can be amended to be backwards compatible, then the data producer may need to create a new table version (e.g., new major version) and publish the data to the new table version. This is depicted in FIG. 7 as the update from version 1.1 to version 2.0, which represents a backward incompatible change and a new table version being created as a result. A new major table version 706C is created using a CreateTable Version( . . . ) API. Table version 706C may be defined according to a schema that is incompatible with table version 706A and table version 706B. For example, one or more fields supported by table version 706A and/or table version 706B may be unsupported in table version 706C. Data 708C may be used to record event stream 710C via according to a data contract corresponding to table version 706C. Data 708C may be used to generate base view 714, which may be defined as a one-to-one mapping between the table and view. The base view 714 may then be used to generate consumer views 716.

Figure 8:
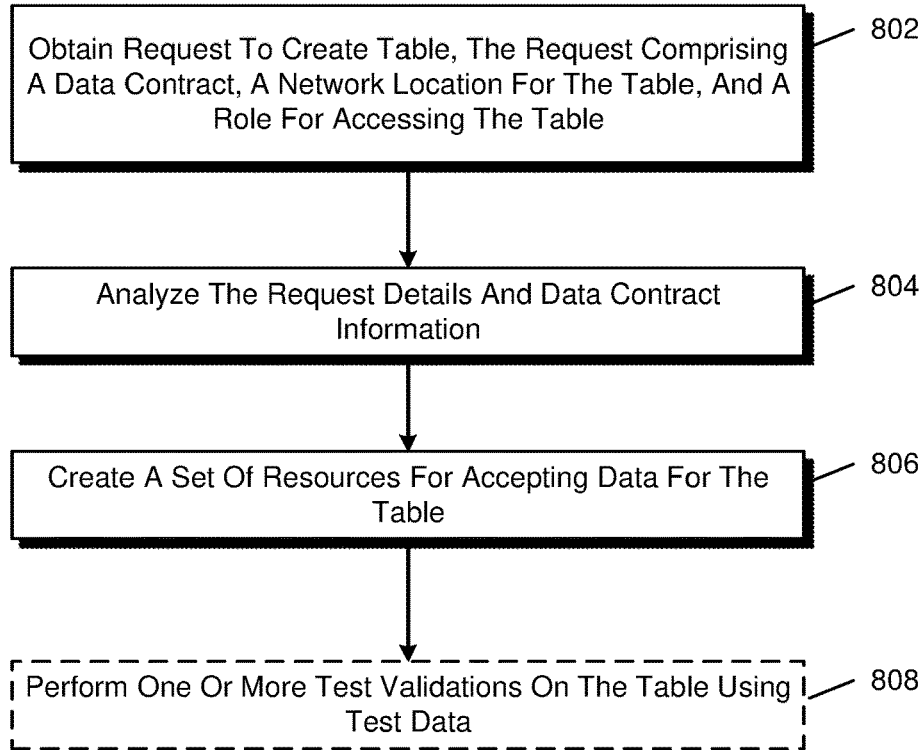
FIG. 8 shows an illustrative example of a process for creating a dataset table, in accordance with one or more example embodiments of the present disclosure.

FIG. 8 shows an illustrative example of a process 800 for creating a dataset table, in accordance with one or more example embodiments of the present disclosure. In at least one embodiment, some or all of the process 800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 800 may be implemented in the context of various systems and methods described elsewhere in this disclosure, such as those discussed in connection with FIGS. 1 and 10. In at least one embodiment, process 800 or a portion thereof is implemented by a computing resource service provider or component thereof, such as a contract table metadata store described in connection with FIG. 1.

In at least one embodiment, process 800 comprises a step 802 to receive or otherwise obtain a request to create a table. In various embodiments, a set of table APIs are supported that provides an API in which clients may provide the details on which the table is to be created. The system may receive the request and invoke a CreateTable( . . . ) API that provides details of a new table to create.

In at least one embodiment, process 800 comprises a step 804 to analyze the request details and contract information. In various embodiments, the request is for a data store dataset. The data store may be a data object store organized into buckets. In various embodiments, process 800 comprises a step to extract or otherwise determine, from a data contract, a network location (e.g., source bucket) and role that may be used to access the bucket. The system performing process 800 may attempt to assume the indicated role and verify permissions. Permissions may be verified on the network location by performing various dataset operations and verifying that certain operations, such as read and write operations, can be performed.

In various embodiments, the data contract comprises a schema and the system performing process 800 will register the schema with a schema registry. On success, the system will store a reference to the registered schema.

In at least one embodiment, process 800 comprises a step 806 to create or otherwise provision a set of resources for accepting data for the created table. The system performing process 80 may invoke a table API, for example, Initialize-eResources( . . . ) that handles creation of a set of computing resources that may be used for accepting data for a table. The set of resources may comprise one or more of the following: a message buffer to receive incoming publish events, a message queue to store invalid events, a step functions state machine to manage acquisition and ingestion processing of the dataset (e.g., one state machine per dataset); a table to store the processed data; and combinations thereof. Table and contract information may be stored together as a single table in a key-value store, and resource identifiers of the infrastructure resources for accepting data for the table may be stored in a separate table of the key-value store.

In at least one embodiment, process 800 comprises a step 808 to perform one or more test validations on the table using test data. Step 808 may be an optional step, as indicated by the dashed lines in FIG. 8. In various embodiments, a data producer has the option to submit test data using a dedicated test API. For example, a PublishTestData ( . . . ) API may be invoked to publish test data that is set with a test flag or otherwise indicated to be test data that should be validated but not be further processed. Once the test data is validated, a synchronous test result may be provided to the caller indicating the validation result for the test data. For example, if the test data does not conform to an applicable data contract, then the result may indicate failure, a particular mode of failure, and so forth.

FIG. 9 shows an illustrative example of a process 900 for data publishing, in accordance with one or more example embodiments of the present disclosure. In at least one embodiment, some or all of the process 900 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 900 may be implemented in the context of various systems and methods described elsewhere in this disclosure, such as those discussed in connection with FIGS. 1 and 10. In at least one embodiment, process 900 or a portion thereof is implemented by a computing resource service provider or component thereof.

In at least one embodiment, process 900 comprises a step for receiving an API from a data producer to publish data. Once a data producer has registered its dataset, a table is created and the data producer can begin publishing data. The data producer may use a single API to make this request. The request may comprise information encoding or otherwise specifying data, and how the data will be applied to the data lake. The data itself may be encoded or otherwise specified in different ways. For example, the API may include a network location where the data can be found. The network location may reference a data object location. The location may include a directory comprising multiple files, or a single file. In the case of multiple files, each file is individually validated against the data contract. For example, if the data contract includes a size limit, then the size of each file is individually compared against the size limit, rather than the size of the entire collection of files. In some embodiments, the data is encoded directly within the API call, for example, as a data blob. The maximum size for the data may be specified based on the data contract or other constraints, such as a per-item limit of a buffer that is used in the data acquisition step functions workflow. For example, if the buffer's item size limit is 1 MB, then the size of the data payload may be limited to around 900 KB, to provide sufficient space for other information that is to be stored alongside the data payload.

Data may be applied in different modes of operation, which can be specified as an API parameter. Data publishers may specify how the data is to be applied to the data lake. For example, a delta or incremental update may be specified, wherein the data is to be applied as a set of records that are incrementally applied to the table. In some embodiments, a snapshot may indicate that the data represents a full set of records that is to replace the existing table dataset.

In various embodiments, a table API may be used for data publish requests. In the API request, the data producer may specify the table details which will be used to identify the table metadata and the data details (e.g., location and mode of operation). For example, if a data producer wishes to apply ordering to a set of events, they can additionally provide a publish time value so that events with the same publish time will be applied to the datalake in the order received. In some embodiments, the API is a HTTP-based representational state transfer (REST) API and a REST API Gateway of the computing resource service provider invokes a function to register to initial event in a key-value store and kick off an acquisition and ingestion workflow that handles validating and publishing the data into the data lake. In some embodiments, the function is executed synchronously, depending on the size of the data. For example, if the data is smaller than a threshold size, the function may synchronously wait for validation and publish steps to be completed before returning a response. However, if the data is larger than the threshold size, then a response may be immediately returned after attempting to execute the acquisition and ingestion workflow, indicating that the request has been queued for execution and that a result may be provided asynchronously upon completion of the step functions workflow.

As part of a step functions workflow, an acquisition phase may be used to collect and validate incoming data from a data producer and persist it in an intermediary store. The intermediary store may be referred to as a chunk store. In various embodiments, when a data event occurs, the acquisition step obtains the corresponding data contract via a table API and validates the event with the data contract. Each data event may be tagged with the table and contract version it was validated with. If the validation is successful, the event (with the tag) is written to the chunk store. Otherwise, if the validation fails, then the event will be placed in a queue that data producers have access to. Data producers may access the queue to remediate failures by either updating the data to conform to the applicable data contract, or to update the data contract and then re-submit the data to be validated against an updated data contract.

When data is written to a chunk store, a data event may be generated that triggers the execution of a data ingestion workflow. As part of a step functions workflow, an ingestion phase may be subsequent to the acquisition phase and occur after data has been validated and written into a chunk store. During the ingestion phase, newly added events may be read from the chunk store and data transformations may be performed to convert the underlying raw data into a datalake compatible format. In various embodiments, the transformation involves a direct 1-to-1 mapping between source and target schemas. In some cases, there may be additional audit columns. Once the data has been processed or transformed, the processed data may be written to a data object data store according to a table format. A table format may refer to a way of organizing a dataset's files to present them as a single logical table. For example, Apache Iceberg may be used on top of the data as a serving layer.

FIG. 9 shows an illustrative example of a process 900 for processing a data event according to a data contract, in accordance with one or more example embodiments of the present disclosure. In at least one embodiment, some or all of the process 900 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 900 may be implemented in the context of various systems and methods described elsewhere in this disclosure, such as those discussed in connection with FIGS. 1-8 and 10. In at least one embodiment, process 900 or a portion thereof is implemented by a computing resource service provider.

In at least one embodiment, process 900 comprises a step 902 to obtain or otherwise receive a request to publish a data event. In various embodiments, a data ingestion service receives an API request to publish data. The request to publish data may be received as a web service API request and may indicate a table or dataset where the data event should be published.

In at least one embodiment, process 900 comprises a step 904 to perform request validation. The publish API may be received via an API gateway that performs initial request validation. The initial request validation may verify that the request is in an expected format, perform authorization checks to ensure that the requestor has sufficient authorization to have the API call processed, and so forth. If the validation succeeds, the service may trigger a workflow to proceed with subsequent steps in process 900.

In at least one embodiment, process 900 comprises a step 906 to store the data event in chunk store. In various embodiments, the data event is then recorded to a non-relational database. For example, chunk store may be implemented as a key-value store. In various embodiments, data events with the same publish time will be sequenced to preserve an order of data events. Once the data event has been written to the chunk store, a data acquisition and ingestion workflow may be executed. The data acquisition and ingestion workflow may be implemented as a step functions workflow and described in accordance with FIGS. 5-6. Data acquisition and ingestion workflow may be provided with the data object location of the data event stored in the chunk store.

In at least one embodiment, process 900 comprises a step 908 to obtain applicable data contract version. The applicable data contract may be obtained from a contract table metadata store. Depending on how the contract versions are stored, the applicable contract version may be retrieved by specifying information that includes the contract identifier and a special contract version, such as version #0, which may be a record of the contract table metadata store that duplicates the contents of the most recent data contract.

In at least one embodiment, process 900 comprises a step 910 to determine whether the data event conforms with the applicable data contract. In various embodiments, the data contract encodes a set of validations that are to be performed on the data event. The validations may include a data size validation, a file format validation, a schema validation, or combinations thereof. A data size validation may be performed wherein the function reads or inspects the network location of the data object to ensure that the total size of the data object does not exceed the maximum content size specified in the contract. In various embodiments, the validation step involves determining the file format of the data object at the network location. For example, the data contract may specify a particular format, such as a *.CSV file is expected, and the data object may be inspected to determine whether it has an allowable file extension according to the data contract. In various embodiments, a schema validation is performed to ensure that the schema of the dataset being processed complies with an expected schema format defined in the data contract.

In at least one embodiment, process 900 comprises a step 912 that is executed if the data event does not conform to the data contract. In some embodiments, this step involves generating a failure event. The failure event may be written to a message queue managed by a message queuing service where the data producer can retrieve and inspect failure events. The failed event may be generated with a task token. The failure event may indicate one or more reasons for failure, such as the data being too large, the data being in an incorrect format, a schema validation failure, and so forth. The data producer may read the failed event from the message queuing service and provided with an opportunity to remediate the failure. In some embodiments, the acquisition phase is paused to allow for the data producer to determine an appropriate remediation. For example, a data producer may retrieve the failure event, determine a cause of failure, and then determine how to correct the error.

In at least one embodiment, process 900 comprises a step 914 to receive updated data contract and/or data event. In various embodiments, the data producer receives a failure event and provides an updated data contract, an updated data event, or both. The validation step may then be performed again, using the updated information, to determine whether the event (e.g., updated event) is valid. Steps 910-914 may be repeated multiple times until a valid data event is received from the data producer. The valid data event may be written to a chunk store, and the process 900 may move to an ingestion phase, as described in greater detail below.

In at least one embodiment, process 900 comprises a step 916 to perform extract, transform, load (ETL) Procedure on validated data event. In various embodiments, the ETL procedure performed on the data event is implemented as a serverless data integration service job. In various embodiments, the job maps the source schema to one or more target schemas and may, in some cases, include audit columns. For example, a serverless compute function may be executed to determine a first target schema of a first consumer-defined view, execute an ETL job on the data to map the data to first target schema to produce first transformed data according to the first view, and then store the first transformed data in a data store. In various embodiments, multiple ETL jobs are executed (e.g., in parallel) when there are multiple target schemas, which can be defined by one or more data consumers. The processed data may be loaded into a processed data object bucket or other suitable data store for persisting the transformed data. The processed data object bucket may be owned by the data ingestion service. On completion, the status may be emitted to chunk store. The status may be used to update the chunk store. In various embodiments, the emitted status may be used to signal the completion of the processing of a first data event, which may be used to trigger or resume the execution of a second data event, for example, in the case where the first data event and the second data event are sequenced data events with the same publish time.

In at least one embodiment, process 900 comprises a step 918 to provide one or more views for consumption by data consumer. In various embodiments, data producer can update the data contract to reflect any data source changes (e.g., schema changes) as well as the base view definition that acts as the interface for consumers to read the data. Views may be generated according to the data producer's base view definitions. Data consumers may register their own views, which can be generated from different data producer owned base views, such as base view and/or base view. The transformed data may be used to generate one or more producer-owned base view, which may be defined as a one-to-one mapping between the table and view. The base view may then be used to generate a consumer view according to a data consumer-defined schema.

One or more operations of the methods, process flows, or use cases of FIGS. 1-10 may have been described above as being performed by a user device, or more specifically, by one or more program module(s), applications, or the like executing on a device. It should be appreciated, however, that any of the operations of the methods, process flows, or use cases of FIGS. 1-10 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-10 may be described in the context of the illustrative devices, it should be appreciated that such operations may be implemented in connection with numerous other device configurations.

The operations described and depicted in the illustrative methods, process flows, and use cases of FIGS. 1-10 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 10:
FIG. 10 illustrates a block diagram of an example machine upon which any of one or more techniques (e.g., methods) may be performed, in accordance with one or more example embodiments of the present disclosure.

FIG. 10 illustrates a block diagram of an example of a machine 1000 (e.g., implemented in whole or in part in the context of embodiments described in connection with other figures. In some embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in Wi-Fi direct, peer-to-peer (P2P) (or other distributed) network environments. The machine 1000 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include any combination of the illustrated components. For example, the machine 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (e.g., drive unit) 1016, a signal generation device 1018, and a network interface device/transceiver 1020 coupled to antenna(s) 1030. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

Data ingestion subsystem 1036 may refer to hardware, software, or a combination thereof that is used to implement various functionalities described in connection with FIGS. 1-9. For example, data ingestion subsystem 1036 may perform various functionalities involved in defining the workflows described in FIGS. 3-6. In various embodiments, the steps of a step functions workflow or state machine described throughout this disclosure are defined or otherwise provisioned by data ingestion subsystem 1036. For example, data ingestion subsystem 1036 may be utilized to configure to implement acquisition and ingestion phases described throughout this disclosure, such as at FIG. 1.

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device." "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating." when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might." or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C." or "at least one of A, B and C." unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may be omitted from various discussions for the sake of clarity.

What is claimed is:

1. A computer-implemented method, comprising:
obtaining, from a data producer of a datalake environment, a first web service application programming interface (API) request to create a table, the first web service API request comprising a data contract specifying a first source schema;
provisioning a set of computing resources in a computing resource service provider for processing data events, the set of computing resources comprising:
a message queue;
an intermediate data store; and
a workflow comprising an acquisition phase and an ingestion phase;
obtaining, from the data producer, a second web service API request to publish a data event, the second web service API request comprising:
a network location for data; and
an identifier associated with the table;
storing the data event in the intermediate data store;
provisioning, in response to the second web service API request, the workflow to execute the acquisition phase, wherein execution of the acquisition phase comprises:
extracting, from the data contract, a set of validations applicable to the data event;
determining that the data passes the set of validations, wherein the set of validations comprises a schema validation that determines whether an actual schema of the data complies with an expected schema of the data contract; and
upon determining that the data passes the set of validations, updating the intermediate data store;
provisioning the workflow, in response to completion of the acquisition phase, to execute the ingestion phase, wherein the ingestion phase comprises:
determining a first target schema of a first view;
executing an extract, transform, load (ETL) procedure on the data to map the first source schema to the first target schema to produce first transformed data according to the first view; and
storing the first transformed data;
mapping the data of the data event to one or more views; and
providing the one or more views to a data consumer of the datalake environment.

2. The computer-implemented method of claim 1, further comprising:
obtaining, from the data producer, a third web service API request to publish a second data event;
storing the second data event in the intermediate data store;' provisioning the acquisition phase for further:
performing, based on the second data event, a set of validations against the data contract;
determining that the second data event failed to pass the set of validations;
generating a failure event on the message queue;
obtaining, from the data producer, an update to the second data event or the data contract;
performing the set of validations based on the update; and
updating the intermediate data store in response to successfully validating that the second data event based on the update.

3. The computer-implemented method of claim 2, wherein the update comprises a second source schema that is backwards compatible with the first source schema.

4. The computer-implemented method of claim 1, wherein the intermediate data store is a key value store.

5. A system, comprising:
one or more processors; and
memory storing executable instructions that, as a result of execution by the one or more processors, cause the system to:
obtain, from a data producer, a first request to publish a first data event, the first request specifying a table;
store the first data event in a data store;
provision a workflow, in response to the first request, to execute a first phase comprising an acquisition phase and a second phase comprising an ingestion phase, the first phase of the workflow comprising steps to:
obtain a first data contract for the table, the first data contract specifying at least a first source schema;
determine, from a first set of validations encoded in the first data contract, a first set of validations that includes a first schema validation according to the first source schema, wherein the first schema validation indicates an expected schema format for data events generated by the data producer;
perform the first set of validations on the first data event to determine whether the first data event is valid, wherein the first set of validations comprises a validation that an actual schema format of the first data event with the expected schema format; and
write, to the data store, an indication of whether the first data event is valid;
provision the workflow to execute the second phase, the second phase of the workflow comprising steps to:
obtain the first data event from the data store, contingent upon the first data event being valid;
determine a first target schema associated with a first view of a data consumer of the first data event; and
execute an extract, transform, load (ETL) procedure on data of the first data event to produce first transformed data according to the first target schema; and
make the first transformed data available to a data consumer.

6. The system of claim 5, wherein the executable instructions include further instructions that, as a result of execution by the one or more processors, further cause the system to:
obtain, from the data producer, a second request to publish a second data event, the second request specifying the table;

perform the first set of validations on the second data event to determine whether the second data event is valid; and based on the second data event being invalid, generate a failure event in a message queue for the data producer.

7. The system of claim 6, wherein the executable instructions include further instructions that, as a result of execution by the one or more processors, further cause the system to:

obtain, from the data producer, a second data contract specifying a second source schema;

persisting the second data contract in a metadata store;

determine, from a second set of validations different from the first set of validations that is encoded in the second data contract, a second schema validation according to the second source schema;

perform the second set of validations on the second data event to determine whether the second data event is valid;

based on the second data event being valid, process second data of the second data event to produce second transformed data according to the first target schema; and make the second transformed data available to the data consumer.

8. The system of claim 7, wherein the second data contract is backwards compatible with the first data contract.

9. The system of claim 6, wherein the first data event and the second data event share a same publish time and are sequenced to indicate an order in which the first data event and the second data event are to be processed.

10. The system of claim 5, wherein:

the first request comprises a data payload; and the executable instructions include further instructions that, as a result of execution by the one or more processors, further cause the system to store the data payload in a temporary data store.

11. The system of claim 5, wherein the executable instructions include further instructions that, as a result of execution by the one or more processors, further cause the system to:

determine that the first data contract comprises a query statement; and remap the data of the first data event to modified data based on the query statement.

12. The system of claim 5, wherein the system comprises a plurality of machines of a computing resource service provider that collectively comprise the memory that stores the executable instructions.

13. A computer-implemented method, comprising:

obtaining, from a data producer, a first request to publish a first data event, the first request specifying a table;

store the first data event in a data store;

provision a workflow, in response to the first request, to execute a first phase comprising an acquisition phase and a second phase comprising an ingestion phase, wherein the first phase of the workflow comprises:

obtaining a data contract for the table, the data contract specifying at least a first source schema;

determining, from a first set of validations encoded in the data contract, a first set of validations that includes a first schema validation according to the first source schema, wherein the first schema validation indicates an expected schema format for data events generated by the data producer;

performing the first set of validations on the first data event to determine whether the first data event is valid, comprising validating an actual schema format of the first data event against the expected schema format; and upon determining that the first data event is valid, writing, to the data store, an indication of whether the first data event is valid;

provisioning the workflow to execute the second phase, wherein the second phase of the workflow comprises:

obtaining the first data event from the data store, contingent upon the first data event being valid;

determining a first target schema associated with a first view of a data consumer of the first data event; and executing an extract, transform, load (ETL) procedure on the data of the first data event to produce transformed data according to the first target schema; and making the transformed data available to a data consumer.

14. The method of claim 13, further comprising:

obtaining, from the data producer, a second request to publish a second data event, the second request specifying the table;

performing the first set of validations on the second data event to determine whether the second data event is valid; and based on the second data event being invalid, generating a failure event in a message queue that is accessible by the data producer.

15. The method of claim 14, further comprising:

obtaining, from the data producer, an updated second data event;

performing the first set of validations on the updated second data event to determine whether the updated second data event is valid;

based on the updated second data event being valid, processing updated second data of the updated second data event to produce second transformed data according to the first target schema; and making the second transformed data available to the data consumer.

16. The method of claim 14, wherein the first data event and the second data event share a same publish time and are sequenced to indicate an order in which the first data event and the second data event are to be processed.

17. The method of claim 13, wherein the first request comprises a data object location where the data is located.

18. The method of claim 13, further comprising:

mapping the transformed data to a view based on a one-to-one mapping defined in the data contract.

19. The method of claim 13, wherein the first set of validations comprises a file format validation of the data.

20. The method of claim 13, wherein the first phase of the workflow is executed by a first set of machines of a computing resource service provider and the second phase of the workflow is executed by a second set of machines of the computing resource service provider.

* * * * *